United States Patent [19]

Rosenberg

[11] 4,361,280

[45] Nov. 30, 1982

[54] FLUID DISTRIBUTION SYSTEM AND PRESSURE EQUALIZER-VALVES USEFUL THEREIN

[76] Inventor: Peretz Rosenberg, Moshav Beit Shearim, Israel

[21] Appl. No.: 52,503

[22] Filed: Jun. 27, 1979

[30] Foreign Application Priority Data

Dec. 15, 1978 [IL] Israel ............................................ 56216

[51] Int. Cl.³ ............................................. B05B 15/00
[52] U.S. Cl. .............................. 239/76; 137/236 R; 137/514.3; 137/514.5; 137/514.7; 239/533.1; 239/551; 239/570
[58] Field of Search ...................... 239/76, 533.1, 551, 239/562, 570, 571; 137/236 R, 881, 514.5, 514.3, 514.7

[56] References Cited

U.S. PATENT DOCUMENTS

| 419,447 | 1/1890 | Hussey | 137/514.7 |
| 2,622,613 | 12/1952 | McNeal | 137/514.3 |
| 2,927,604 | 3/1960 | Johnson | 137/514.5 |

FOREIGN PATENT DOCUMENTS

| 568551 | 1/1959 | Canada | 239/76 |
| 1070872 | 10/1959 | Fed. Rep. of Germany | 239/551 |
| 1103330 | 11/1955 | France | 137/881 |
| 52-47479 | 4/1977 | Japan | 239/76 |
| 557132 | 5/1946 | United Kingdom | 239/76 |

Primary Examiner—Robert B. Reeves
Assistant Examiner—Michael J. Forman
Attorney, Agent, or Firm—Benjamin J. Barish

[57] ABSTRACT

A fluid distribution system is described including a plurality of utilization devices, such as water sprinklers or drippers, supplied with pressurized fluid, characterized in that the inlet pressure to the utilization devices is substantially equalized by the provision of pressure-equalizer valves. Each valve includes means for producing a pressure drop having a first component compensating for the pressure change due to the elevation of the utilization device, and a second component compensating for the pressure drop due to the distance of fluid flow to the utilization device. Also described are pressure-equalizer valve constructions producing pressure drops having the above two components.

5 Claims, 8 Drawing Figures

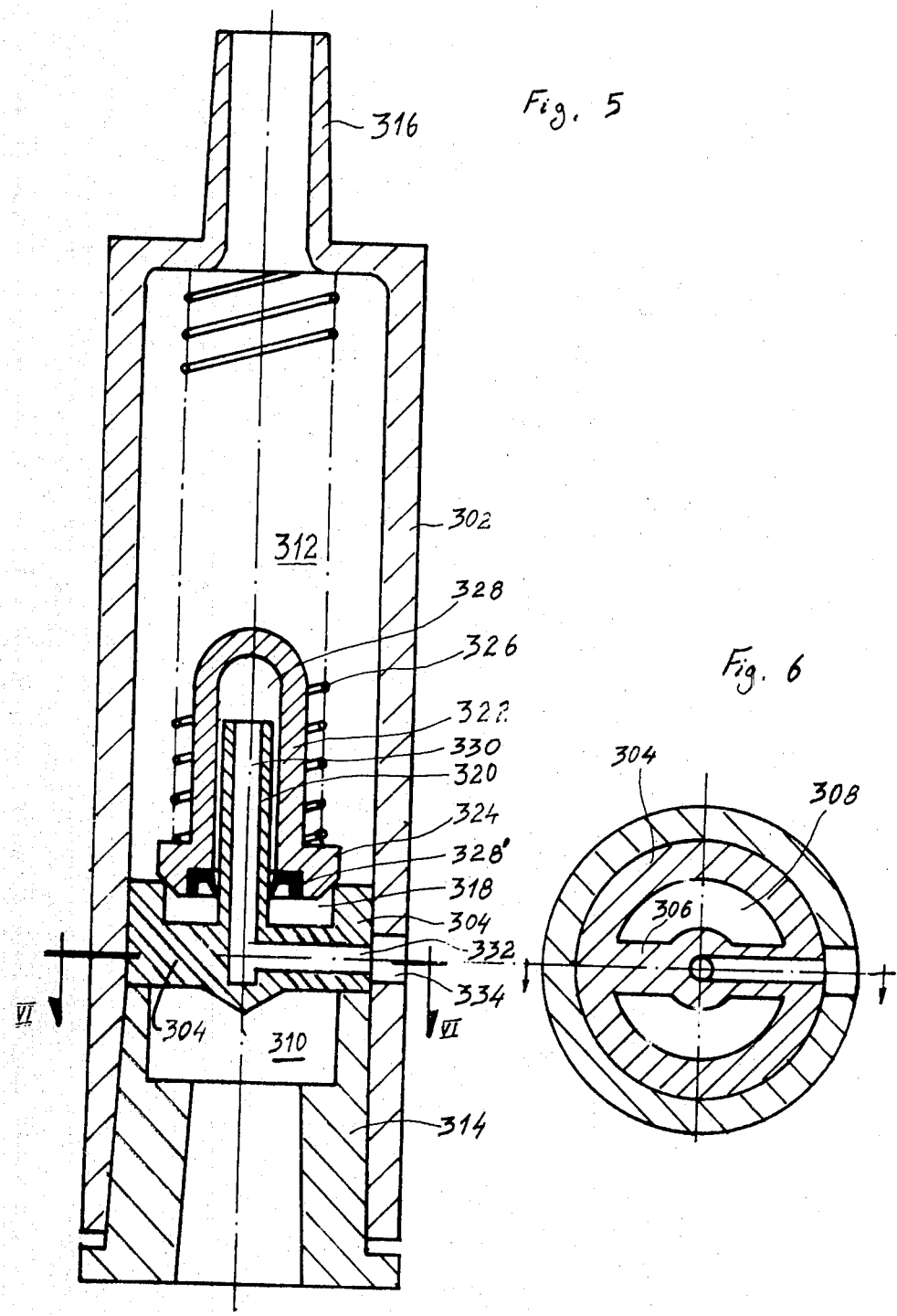

FLUID DISTRIBUTION SYSTEM AND PRESSURE EQUALIZER-VALVES USEFUL THEREIN

BACKGROUND OF THE INVENTION

The present invention relates to fluid distribution systems, and also to pressure equalizer-valves useful in such systems. The invention is particularly useful in water irrigation systems, and is therefore described below with respect to this application.

Water irrigation systems are commonly provided with pressure regulators and/or flow regulators to fix the outlet pressure or flow rate at predetermined values despite variations in the inlet pressure. When such regulators are used, however, it is necessary that one be provided for each branch and/or irrigation device (e.g. sprinkler, dripper) whose pressure or flow rate is to be regulated; this increases substantially the installation and maintenance costs of the system. In addition, the regulators properly preform their functions only when the inlet pressure is above a predetermined value; if the inlet pressure drops below that value, the regulator ceases to regulate. Further, since flow regulators fix the outlet flow rate at a predetermined value, a branch line having irrigating devices requiring different flow rates (e.g., high flow-rate devices for large trees, and low flow-rate devices for smaller plants) would require different value regulators for the different devices; this may not only increase the required number of regulators but usually also complicates the overall design of the system.

The present invention is not based o the conventional concept of fixing the outlet pressure or flow rate to the utilization device at a predetermined value, as in the systems using pressure regulators and flow regulators; rather, the present invention is based on the concept of substantially equalizing the inlet pressures to all the utilization devices, while permitting the inlet pressure to the utilization devices to vary with the inlet pressure applied to the input line. Thus, if the inlet line pressure increases, this will also cause an increase in the inlet pressure to all the utilization devices, but the increase in pressure will be the same for all such devices. The same occurs if the inlet line pressure is decreased. Designing the fluid distribution system according to this "pressure-equalizer" concept, which provides a number of important advantages as described more particularly below, is based on the following analysis:

The inlet pressure at each utilization device in a pressurized fluid distribution system is equal to the inlet pressure of the line, less: (1) the static pressure change resulting from the difference in elevation of the utilization device relative to that of the inlet line; and (2) the dynamic pressure change resulting from fluid flow in the line to the respective utilization device. The static pressure change may be an increase or a decrease and is a fixed value depending on the relative elevation of the respective utilization device; whereas the dynamic pressure change, which is always a decrease, arises from the flow of the fluid to the utilization device and depends on the location of the utilization device in the line. It can be shown that substantially all the dynamic pressure change occurs in the first third of the line; the dynamic pressure change in the last two-thirds of the line is so small as to be practically negligible in designing the fluid distribution system.

SUMMARY OF THE INVENTION

The present invention is based on the concept of using pressure-equalizer valves to introduce pressure drops in the system only where, and to the extent, needed to compensate for the above static and dynamic pressure changes so as to substantially equalize the inlet pressures to all the utilization devices in the fluid distribution system. This concept permits fluid distribution systems to be designed which are satisfactory for most applications by the use of only a relatively small number of pressure equalizer-valves, frequently but a fraction of the number of pressure regulators and fluid regulators normally required in a conventionally-designed system. As an example, in a water irrigation system extending over a relatively flat terrain, pressure equalizers would be required in only about the first one-third of the line where substantially all the dynamic pressure-drop takes place. Such a system would substantially reduce the original installation and maintenance costs, and would also substantially simplify the design of the system.

The invention provides a fluid distribution system including a pressurized inlet line and a plurality of utilization devices supplied with pressurized fluid therefrom, characterized in that the inlet pressure to said utilization devices is substantially equalized by the provision of a pressure-equalizer valve at the inlet side of one or more of said utilization devices, which pressure equalizer-valve includes means for producing a pressure drop having a first component compensating for the pressure change due to the elevation of the utilization device relative to that of the inlet line, and a second component compensating for the pressure drop due to the distance of fluid flow from the inlet line to the utilization device.

According to the present invention, there is provided a pressure-equalizer valve particularly useful in the foregoing fluid distribution system, the pressure-equalizer valve comprising: a housing having an inlet, an outlet, and a connecting passageway therebetween; a valve member located on the outlet side of said passageway such that the outlet pressure tends to move same to restrict the passageway and the inlet pressure tends to move same to enlarge the passageway; biasing means applying a constant force to said valve member tending to move same to restrict said passageway; a chamber of smaller cross-sectional area than the valve member and defined by two members one of which is fixed and the other of which constitutes a movable control member and is coupled to the valve member such that movement of the control member in one direction to contract the chamber moves the valve member to restrict said passageway, and movement of the control member in the opposite direction to expand the chamber moves the valve member to enlarge said passageway; said chamber being vented to the atmosphere; whereby said pressure-equalizer valve produces a pressure drop including a first component to compensate for the elevation of the utilization device relative to that of the inlet to the system which first component depends on the force applied by said biasing means, and a second component to compensate for the location of the utilization device from the inlet to the system which second component depends on the cross-sectional area of said chamber relative to that of the valve member.

Further features and advantages of the invention will be apparent from the description below.

BRIEF DESCRIPTION OF THE DRAWINGS

The invention is herein described, by way of example only, with reference to the accompanying drawings, wherein:

FIGS. 5 and 6 illustrate a further variation. FIG. 6 being a sectional view along lines VI—VI of FIG. 5.

DESCRIPTION OF PREFERRED EMBODIMENTS

Figure 1:
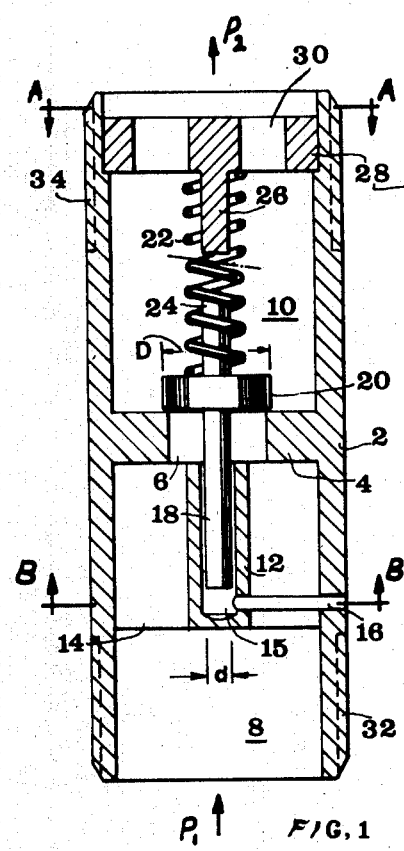
FIG. 1 is a longitudinal sectional view illustrating one form of pressure-equalizer valve constructed in accordance with the present invention.
Figure 1A:
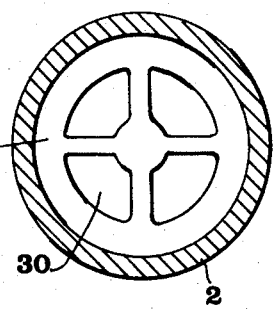
FIGS. 1a and 1b are transverse sectional views along lines A—A and B—B of FIG. 1.
Figure 1B:
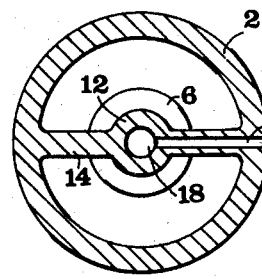

The pressure-equalizer valve illustrated in FIG. 1 comprises a housing 2 having an internal partition 4 formed with central opening 6 defining a passageway connecting one side 8 of the housing, constituting the housing inlet, to the opposite side 10, constituting the housing outlet. A cylinder 12 is fixed within the inlet 8 side of the housing by a diametral wall 14 (FIG. 1b) integrally formed with the housing. One end of cylinder 12 is disposed adjacent to, and is open with respect to, the passageway defined by the central opening 6; and the opposite end of the cylinder is vented to the atmosphere by a further passageway 16 formed through wall 14.

A rod or stem 18 is slidable in a cylinder 12 with minimum clearance and projects through opening 6 to the outlet side 10 of the housing, wherein it carries a disc-shaped valve member 20. The latter is thus moved towards or away from opening 6, thereby restricting or enlarging the passageway between the inlet 8 and outlet 10 defined by this opening. Valve member 20 is biassed towards opening 6 (i.e., in the direction tending to restrict the passageway) by a coil spring 22 interposed between another stem 24 fixed to the valve member 20, and a further stem 26 carried by the housing in alignment with stem 24.

Stem 26 is formed centrally of a disc 28 attached, as by threads, to the outlet side 10 of the housing, disc 28 being provided with a plurality of openings 30 for outletting the fluid.

Housing 2 is of substantially cylindrical shape and is provided at its opposite ends with external threads 32, 34 for attaching same in-line to a fluid distribution system supplying fluid to a utilization device, such as irrigation water to a sprinkler or dripper.

It will be seen that disc 20 constitutes a valve member located on the outlet side of the passageway defined by opening 6 such that the inlet pressure tends to move the valve member away from opening 6 to enlarge the passageway. It will also be seen that spring 22 constitutes biassing means for applying a constant force to the valve member tending to move same toward opening 6 to restrict the passageway. Further, it will be seen that since chamber 15, at the inner end of cylinder 12 defined by stem 18, is vented by passageway 16 to the atmosphere, the stem will be displaceable within the cylinder in accordance with the outlet pressure. Thus, stem 18 constitutes a controlled member displaceable within cylinder 12 and exposed to the outlet pressure such that its displacement by the outlet pressure tends to move it and the valve member 20 to restrict the passageway defined by opening 6.

It can be shown that the outlet pressure ($P_2$) at the outlet side 10 of the pressure-equalizer valve illustrated in FIG. 1 will have the following value:

$$P_2 = (P_1 - \Delta P)\left(1 - \frac{d^2}{D^2 - d^2}\right)$$

wherein:

$P_1$ = inlet pressure;

$\Delta P = \dfrac{\text{force of spring 22}}{\pi D^2/4}$;

$d$ = diameter of rod 18; and $D$ = diameter of valve member 20.

Thus, the pressure-equalizer valve can be easily designed to produce the desired pressure drop by appropriately determining the two above variables, namely: (1) the strength of spring 22; and (2) the relative diameters of rod 18 (theoretically the same as the inner diameter of cylinder 12), and of valve member 20 (i.e., within its sealing line). The first variable, namely the strength of spring 22, is used to compensate for the pressure drop due to the elevation of the respective utilization device relative to that of the inlet line. The second variable, namely the relative diameters of stem 18 (cylinder 12) and valve member 20, is used to compensate for the pressure drop due to the distance of the respective utilization device from the beginning of the inlet line.

Thus, the pressure-equalizer valve illustrated in FIG. 1 may be designed to provide the appropriate pressure-drop for any utilization device according to its relative elevation and location in the fluid distribution line so that all the utilization devices in the line will be supplied with substantially the same inlet pressure. Providing substantially equal outlet pressures to all the utilization devices can be effected by the use of a relatively small number of the pressure-equalizer valves described above, which number is considerably smaller than the number of pressure-regulators or flow-regulators normally required in a conventional fully-regulated system.

The pressure-equalizer valve used in such a system can take many other forms.

Figure 2:
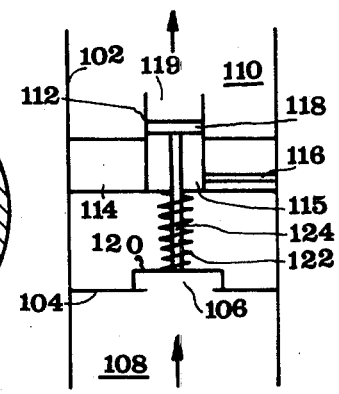
FIGS. 2 and 3 diagramatically illustrate two further forms of pressure-equalizer valves constructed in accordance with the present invention.

The pressure-equalizer valve diagrammatically illustrated in FIG. 2 comprises a housing 102 having an internal partition 104 formed with a central opening 106 defining a passageway connecting the inlet side 108 of the housing to the outlet side 110. In the arrangement of FIG. 2, however, cylinder 112 is fixed, as by diametral wall 114, centrally within the housing outlet 110 in alignment with passageway 106. The inner end 115 of cylinder 112 is vented to the atmosphere by passageway 116 formed through wall 114. In addition, the control member displaceable within cylinder 112 is in the form of a piston 118 which divides the cylinder into chamber 115 vented to the atmosphere, and a second chamber 119 exposed to the outlet pressure.

The valve illustrated in FIG. 2 further includes a valve member located on the outlet side of partition 104 such that the inlet pressure tends to move same to enlarge the passageway defined by opening 106. Piston 118 is rigidly coupled to valve member 120 by means of a stem 124 passing through an opening in the bottom of cylinder 112, there being a spring 122 interposed between valve member 120 and the bottom of cylinder 112.

Spring 122 in FIG. 2 thus applies a constant biasing force to valve member 120 tending to move same to restrict the passageway defined by opening 106. In addition, the outlet pressure in chamber 119 applied to piston 118 tends to displace the piston, and thereby to move the valve member 120, in the direction tending to restrict the passageway defined by opening 106.

It will thus be seen that the pressure-equalizer valve illustrated in FIG. 2 operates substantially in the same manner as that described above with respect to FIG. 1. Accordingly, the pressure-equalizer valve of FIG. 2 may also be used to produce a pressure drop with respect to a utilization device in a fluid distribution line in order to compensate (by using the appropriate spring 122) for the pressure drop due to the relative elevation of the respective utilization device in the fluid distribution line, and also to compensate (by the appropriate selection of the diameter of piston 118 with respect to that of the valve member 120) for the pressure drop due to the location of the respective utilization device in the line.

Figure 3:
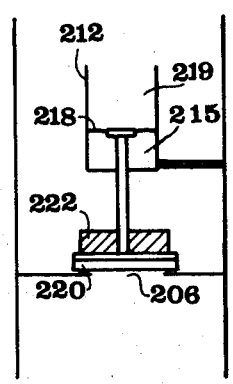

FIG. 3 illustrates a still further variation, similar to that of FIG. 2, except that instead of using a piston (118) for the control member, there is used a diaghphram 218, this being located in a cylinder 212 and dividing same into a first chamber 215 vented to the atmosphere, and a second chamber 219 exposed to the outlet pressure, as in the embodiment of FIG. 2. In addition, the arrangement illustrated in FIG. 3 includes a weight 222 (instead of the spring 122) for applying the constant force to the valve member 220 tending to move same to restrict the passageway defined by the opening 206. A further difference in FIG. 3 over that of FIG. 2 is that the stem 216, passing through the bottom of the cylinder 212, is not fixed to the valve member 220, as in FIG. 2, but rather abuts the valve member. The arrangement is such that the movement of the diaghphragm 218 and stem 216 by the outlet pressure to restrict the passageway defined by opening 206, also moves, by an abutting force, the valve member 220 in this direction; whereas the valve member 220 is caused to follow the diaghphragm 218 in the opposite direction by the inlet pressure.

Figure 4:
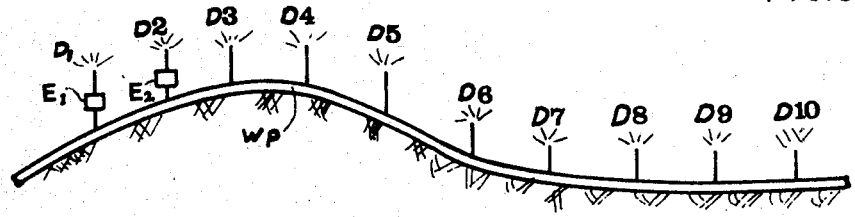
FIG. 4 diagmatically illustrates a water irrigation system including a plurality of the pressure-equalizer valves of any of FIGS. 1-3.

FIG. 4 diagrammatically illustrates a water irrigation system including a plurality of water irrigation devices $D_1$–$D_{10}$, such as water sprinklers or drippers, supplied from a common water pipe WP. In this case, the terrain is such that there is a gradual rise at the beginning of the line including the irrigating devices $D_1$–$D_3$ and then a gradual decline to irrigating device $D_7$, after which the terrain including irrigating devices $D_8$–$D_{10}$ is substantially flat. It will thus be seen that the static pressure changes due to elevational differences tend to decrease the outlet pressure from devices $D_1$–$D_3$, to increase the outlet pressure from devices $D_4$–$D_7$, and to have no significant effect in devices $D_8$–$D_{10}$; whereas the dynamic pressure changes due to fluid flow tend to decrease the outlet pressure from the first one-third of the devices (e.g. $D_1$–$D_4$) and to have no significant effect from the remainder (e.g. $D_5$–$D_{10}$).

In order to substantially equalize the outlet pressures at the irrigation devices $D_1$–$D_{10}$, an equalizer-valve is provided where needed. Thus, since irrigation device $D_3$ is at the highest level, this would be considered the "reference" level and no equalizer would be provided there. Irrigation device $D_1$ would be provided with an equalizer-valve $E_1$ to reduce the pressure to that of irrigation device $D_3$. Similarly, irrigation device $D_2$ would be provided with an equalizer-valve $E_2$, but one producing a smaller pressure drop than valve $E_1$, so as to equalize the pressure at $D_2$ to that at the higher elevation $D_3$. Irrigation devices $D_4$, $D_5$, $D_6$ and $D_7$, each being at a slightly lower elevation than $D_3$, would not require an equalizer-valve since the increase in static pressure due to the elevational difference of each over the "reference" level ($D_3$) is substantially compensated for by the dynamic pressure drop due to the water flow through the pipe. Finally, devices $D_8$–$D_{10}$ would not require equalizer valves since the dynamic pressure changes due to fluid flow are negligible at this remote end of the water pipe.

In practice, it is not necessary to produce precisely equal outlet pressures, but only approximately equal outlet pressures. Thus, in the system illustrated in FIG. 4, this can be accomplished by the use of only two equalizer-valves $E_1$ and $E_2$, rather than 10 devices if conventional pressure regulators for flow regulators were used.

FIGS. 5 and 6 illustrate a further variation wherein the cylinder, which forms the chamber of smaller cross-sectional area than the valve member, is the movable control member. It moves with respect to a stem fixed to the housing.

Thus, the pressure-equalizer valve illustrated in FIGS. 5 and 6 comprising a housing 302 which receives an internal annular ring 304 formed with a diametrical web 306 defining a pair of openings 308 through the ring. Ring 304 thus divides the interior of housing 302 into an inlet chamber 310 and an outlet chamber 312. The inlet end of housing 302 frictionally receives a conical plug 314 adapted to be connected to the upstream pipe (not shown), and the outlet end of the housing is formed with a reduced-diameter conical stem 316 for attachment to the downstream pipe.

The outlet-facing side of ring 304 is formed with an annular recess 318 and a central vertical stem 320 receiving a cylinder 322 having an enlarged head 324. A coil spring 326 is interposed between head 324 and the outlet end of housing 302 and biasses the head towards ring 304. A seal 328' is provided between stem 320 and cylinder 322.

Cylinder 322 has an internal diameter just slightly larger than the outer diameter of stem 320. The end of cylinder 322 opposite to that of the enlarged head 324 is closed by a curved wall and extends above the upper end of stem 320 to define a chamber 328. This chamber 328 is vented to the atmosphere via an axial bore 330 formed through stem 320, a second bore 332 formed through web 306 of ring 304, and a further bore 334 formed through the wall of housing 302.

It will thus be seen that openings 308 and annular recess 318 in ring 304 constitute a passageway interconnecting the inlet chamber 310 with the outlet chamber 312, and that the enlarged head 324 carried at the lower end of cylinder 322 constitutes a valve member which is moved towards or away from this passageway to restrict or enlarge it. It will further be seen that valve member 324 is located at the outlet side of this passageway, and the inlet pressure tends to move it to enlarge the passageway, spring 326 applying a constant biasing force tending to move the valve member 324 to restrict the passageway. Still further, it will be seen that the chamber 328, defined by cylinder 326 and stem 320, is of smaller cross-sectional area than the valve member 324, and is vented, via bores 330, 332 and 334, to the atmosphere.

Accordingly, the pressure-equalizer valve illustrated in FIGS. 5 and 6 will operate in the same manner as described above; namely, it will produce a pressure drop including a first component (depending on the force of spring 326) to compensate for the elevation of the utilization device with which it is used relative to that of the inlet to the system, and a second component (depending on the cross-sectional area of chamber 328 relative to that of the valve member 324) to compensate for the location of the utilization device from the inlet to the system.

While the invention has been described with respect to several preferred embodiments, it will be appreciated that many other variations, modifications and applications of the invention may be made.

What is claimed is:

1. A pressure-equalizer valve particularly useful in a fluid distribution system for supplying fluid to a plurality of utilization devices, comprising: a housing having an inlet, an outlet, and a connecting passageway therebetween; a valve member located on the outlet side of said passageway such that the outlet pressure tends to move same to restrict the passageway and the inlet pressure tends to move same to enlarge the passageway; biasing means for applying a constant force to said valve member tending to move same to restrict said passageway; a chamber of smaller cross-sectional area than the valve member and defined by a stem fixed to the housing and a cylinder disposed at the outlet side of the housing and coupled to the valve member such that movement of the cylinder in one direction to contract the chamber moves the valve member to restrict said passageway, and movement of the cylinder in the opposite direction to expand the chamber moves the valve member to enlarge said passageway; said chamber being vented to the atmosphere; whereby said pressure-equalizer valve produces a pressure drop including a first component to compensate for the elevation of the utilization device relative to that of the inlet to the system which first component depends on the force applied by said biasing means, and a second component to compensate for the location of the utilization device from the inlet to the system which second component depends on the cross-sectional area of said chamber relative to that of the valve member.

2. A valve according to claim 1, wherein said biassing means comprises a spring.

3. A valve according to claim 1, wherein the valve member is carried at one end of the cylinder, and the fixed stem includes an axial bore venting the chamber to the atmosphere.

4. A fluid distribution system including a plurality of utilization devices, and at least one pressure-equalizer valve each according to claim 1, for substantially equalizing the pressure applied to said utilization devices.

5. A system according to claim 4, wherein said utilization devices are water irrigation devices.

* * * * *